//  
United States Patent [19]

Süling et al.

[11] 4,255,546

[45] Mar. 10, 1981

[54] ACRYLONITRILE POLYMERIZATION IN FLUORINATED HYDROCARBONS

[75] Inventors: Carlhans Süling, Odenthal; Siegfried Korte, Leverkusen; Theo Neukam, Dormagen, all of Fed. Rep. of Germany

[73] Assignee: Bayer Aktiengesellschaft, Leverkusen, Fed. Rep. of Germany

[21] Appl. No.: 77,460

[22] Filed: Sep. 20, 1979

[30] Foreign Application Priority Data

Oct. 4, 1978 [DE] Fed. Rep. of Germany ....... 2843157

[51] Int. Cl.$^3$ ................................................ C08F 4/40
[52] U.S. Cl. ............................. 526/206; 260/32.6 N; 526/329.3; 526/341
[58] Field of Search .......................................... 526/206

[56] References Cited

U.S. PATENT DOCUMENTS 2,837,559   6/1958   Fields .................................. 526/206

*Primary Examiner*—Stanford M. Levin
*Attorney, Agent, or Firm*—Sprung, Felfe, Horn, Lynch & Kramer

[57] ABSTRACT

The invention relates to a process for the production of polyacrylonitrile or acrylonitrile copolymers, the polymerization being carried out at a temperature of from −40° to +60° C. optionally under pressure in an aliphatic chlorofluorine or fluorine substituted hydrocarbon containing up to 8 carbon atoms and having a boiling point of from −60° to +50° C. or in mixtures thereof having boiling ranges of from −60° to +50° C. and using a starter system comprising a hydroperoxide sulphur dioxide and an acid. The system may also contain aliphatic hydrocarbons in such quantities that a non-inflammable mixture is formed.

7 Claims, No Drawings

ACRYLONITRILE POLYMERIZATION IN FLUORINATED HYDROCARBONS

This invention relates to a process for the production of polyacrylonitrile and copolymers predominantly containing acrylonitrile which have an improved affinity for basic dyes, by polymerization in aliphatic chlorofluorine - or fluorine-substituted hydrocarbons or mixtures thereof in the presence of a redox system.

It is known that the production of polyacrylonitrile and copolymers predominantly containing acrylonitrile, which are for example suitable for spinning into acrylic and modacrylic fibers or which are important as thermo-plastic materials for processing into films and bottle-like hollow bodies, is generally carried out in aqueous media. This production process involves several stages, including distillation steps for working up the polymer, which make complete recycling of all of the components of the system difficult and, above all, expensive in terms of energy.

In addition, it is necessary to use generally ionic co-monomers for acrylonitrile polymers obtained from aqueous media in order to obtain a high affinity for cationic or anionic dyes. Unfortunately, the use of ionic comonomers frequently gives rise to ecological problems.

It is known that acrylonitrile can be polymerized in aliphatic or aromatic hydrocarbons using azo catalysts (Faserforschung und Textiltechnik 12 (1961), 5, page 208, and Faserforschung und Textiltechnik 15 (1965), page 331).

In general, however, it has been found that, where polymerization is carried out in systems such as these, the use of azo catalysts and also peroxidic compounds alone, i.e. without the addition of an activating component, necessitates relatively high reaction temperatures which gives rise to heavily discolored products having a high molecular inconsistency factor. Another disadvantage of this process is that the ionic dye-receptive comonomers normally used have to be left out altogether because they are insoluble in the system and, for this reason, are not incorporated during the polymerization reaction. This adversely affects the coloristic properties of the polymers thus obtained and of the mouldings produced from them.

According to an earlier proposal, however, high-quality acrylonitrile polymers without any of the deficiencies referred to above can be obtained, even in aliphatic hydrocarbons as the reaction medium, by using a special starter system. In particular, it is possible with this process by reducing the polymerization temperature to achieve a narrow molecular weight distribution, high thermal stability and, in addition, good coloristic properties with respect to cationic dyes in the absence of special dye-receptive comonomers.

Another advantage is that the residual monomers and also the precipitant and washing agent may largely by recycled.

Nevertheless, this process also has certain limitations in its scope of application because elaborate safety precautions have to be taken in regard to the reactor systems, for example because of the inflammability of the hydrocarbons or the dangers of explosion in air mixtures, such as occur for example in drying processes.

Accordingly, it is an object of the present invention to provide a process for the production of acrylonitrile polymers which avoids the disadvantages referred to above.

It is a further object of this invention to provide a process for the production of acrylic polymers that have excellent affinity for dyestuffs even in the absence of dye-receptive co-monomers.

Still another object is to provide a process for the production of acrylic polymers having a narrow molecular weight distribution and a good natural color and thermal stability. Other objects will be evident from the specification and the Examples.

It has now been found that these objects can be accomplished by polymerizing acrylonitrile alone or in the presence of other copolymerizable monomers in aliphatic chloroflourine - or fluorine-substituted hydrocarbons or mixtures thereof and optionally in conjunction with aliphatic hydrocarbons and using a starter system consisting of sulphur dioxide, an organic hydroperoxide and an organic acid. Excellent volume-time yields of readily processible products are obtained.

Accordingly, the present invention relates to a process for the production of polyacrylonitrile or acrylonitrile copolymers which comprises polymerizing acrylonitrile alone or with up to 30% by weight of at least one ethylenically unsaturated comonomer at a temperature of from $-40°$ to $+60°$ C., optionally under pressure, in an aliphatic chlorofluorine- or fluorine-substituted hydrocarbobn containing up to 8 carbon atoms and having a boiling point of from $-60°$ to $+50°$ C. or in mixtures thereof having boiling ranges of from $-60°$ to $+50°$ C. and optionally in conjunction with an aliphatic hydrocarbon and/or mixtures thereof having a boiling point (range) of from $-60°$ to $+50°$ C. in such quantities that a non-inflammable mixture is formed; and using a starter system consisting of from 0.1 to 0.3 mole % of a hydroperoxide, from 0.1 to 12 mole % of sulphur dioxide and from 0.01 to 1.0 mole % of an acid (based in each case on the total amount of monomer used), polymerization being continued up to conversions of from 30 to 90% by weight.

By this process it is possible to obtain homopolymers and copolymers of acrylonitrile containing up to 30 % by weight of incorporated comonomer units free from ionic groups which have K-values of from 55 to 100, an adsorption capacity for cationic dyes of at least 0.5% by weight, a Siemens conductivity of at least $10\mu$, as measured in dimethyl formamide, and contents of polymer-fixed sulphur of from 0.2 to 1.6% by weight.

Comonomers suitable for the purposes of the invention are any ethylenically unsaturated compounds which can be copolymerised with acrylonitrile and which are soluble in the aliphatic halogen-substituted hydrocarbons or mixtures thereof with acrylonitrile used as the precipitation medium. Particularly suitable comonomers are the esters of acrylic and methacrylic acid, vinyl esters of aliphatic carboxylic acids, styrene and alkyl-substituted styrene, such as for example α-methyl styrene or 4-tert.-butyl styrene, maleic acid anhydride and N-alkyl-substituted maleic acid imides. The advantage of the process according to the invention is reflected inter alia in the fact that is is also possible to use comonomers, such as maleic acid anhydride and maleic acid imides corresponding to the general formula

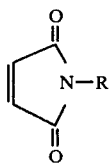

in which R represents a linear, branched or cylic alkyl radical containing up to 12 carbon atoms, preferably a methyl or cyclohexyl radical.

In other processes, for example in cases where polymerization is carried out in aqueous media, these monomers are incapable or only inadequately capable of copolymerizing with acrylonitrile. In a particularly preferred embodiment of the invention, maleic acid anhydride and also the above-mentioned maleic acid imides are copolymerized with acrylonitrile in combination with styrene in molar ratios of from 1:1 to 1:4.

The above-mentioned monomers copolymerizable with acrylonitrile are used in quantities of up to 30% by weight, based on the monomer mixture as a whole. For some applications, it is preferred to use polymers with comonomer contents of up to 15% by weight.

The process according to the invention uses the technique of precipitation polymerization, that is to say during the reaction, the polymeric materials formed are precipitated from the aliphatic chlorofluorine-substituted or fluorine-substituted hydrocarbon(s) used as precipitation medium in the form of readily filterable particles. The process may be carried out continuously, in batches, under pressure or under reflux.

It has proved to be of advantage to work under reflux because, by virtue of the high evaporation enthalpies of the halogen-substituted hydrocarbons, the heat of polymerization can be effectively dissipated without any need for elaborate control systems, so that it is possible to achieve very high total monomer concentrations which in turn lead to very good volume-time yields. The ratio between the amount of monomer used and the amount of precipitation medium has to be adjusted according to the required conversions which may vary between 30 and 95% by weight, but preferably reach levels of from 75 to 90% by weight. The proportion of total amount of monomer used in the reacting system amounts to between 6 and 90% by weight and preferably to between 40 and 60% by weight where polymerization is carried out under reflux and to between 7 and 40% by weight and preferably to between 25 and 35% by weight where polymerization is carried out under pressure, based in each case on the sum total of the parts by weight of monomer and precipitation medium.

The chlorofluorine- or fluorine-substituted hydrocarbons dominating the reaction medium may be pure substances, linear and/or cyclic compounds containing up to 8 carbon atoms and having boiling points of from −60° to +50° C. or, if desired, may be used in the form of their mixtures with boiling ranges of from −60° to +50° C. If desired, however, aliphatic hydrocarbons or mixtures thereof with boiling points or boiling point ranges of from −60° to +50° C. may additionally be added to the reaction medium without interfering with polymerization in such quantities that a non-inflammable mixture is formed. Combined with the advantages of these halogenated hydrocarbons, such as simple handling, non-inflammability, and non-toxicity, is their ability, arising out of their polarity, also to dissolve correspondingly polar comonomers, thus considerably increasing the range of the comonomers, for example by comparison with pure aliphatic hydrocarbons. In addition, they are completely inert with respect to monomers. Examples of preferred halogenated hydrocarbons are trichlorofluoromethane (b.p. 23.7° C.); dichlorodifluoromethane (b.p. −29.8° C.), chlorodifluoromethene (b.p. −40.8° C.); trichlorotrifluoroethane (b.p. 47.6° C.); monochloromonofluoroethane (b.p. 35° C.); dichlorotrifluoroethane (b.p. 27.8° C.); monochlorotrifluoroethane (17.2° C.); dichlorotetrafluoroethane (b.p.3.6° C.); monochlorotetrafluoroethane (b.p. −10° C.); difluoroethane (b.p. −25° C.); pentafluoroethane (−48.3° C.) and perfluorocyclooctane (b.p. −3° C.). Dichlorotetrafluoroethane and trichlorofluoromethane are particularly preferred.

An important feature of the process according to the invention is the use of a redox catalyst system consisting of sulphur dioxide, a hydroperoxide and an organic acid which makes it possible for polymerization to be carried out at low temperatures in the range from −40° to +60° C. and preferably at temperatures in the range from −30° to +40° C. Working at temperatures in this range provides the products with excellent natural colors and narrow molecular weight distributions.

The sulphur dioxide, which may be used both in liquid and also in gaseous form, may be added to the polymerization mixture in quantities of from 0.1 to 12 mole %, based on the total amount of monomers used.

Preferred hydroperoxides are hydroperoxides substituted by secondary and tertiary alkyl groups and also hydroperoxides containing aralkyl groups, of the type obtained for exmample by alkylating hydrogen peroxide with suitable alkyl halides, dialkyl sulphates or alcohols in the presence of strong acids or by the addition of hydrogen peroxide with olefins. These hydroperoxides are used in quantities of from 0.1 to 3 mole %. In principle, peracids may also be used for initiation. Depending on the type of chlorofluorinated hydrocarbon used, the peroxide may be completely or partly dissolved or emulsified.

It is preferred to use cumene hydroperoxide and tert-butyl hydroperoxide because of their ready availability. The properties of the polymers formed are also critically determined by the ratio in which the two redox components, $SO_2$ and hydroperoxide, are used. It has proved to be of advantage to use these two redox components in a ratio of from 1:1 to 7:1.

In addition, a system-soluble acid is used with the two redox components. This acid is in particular an organic acid, preferably a partly halogenated and perhalogenated carboxylic acid containing up to 10 carbon atoms, and is used in a quantity of from 0.01 to 1 mole %. Preferred carboxylic acids of this type are trichloroacetic acid, perchloropropionic acid and perchlorobutyric acid. The carboxylic acids have a regulating effect on the initiation of the polymerization reaction. A further improvement in thermal stability is obtained in this way.

The precipitation polymers accumulating in the process according to the invention may be isolated in highly pure form by filtration and evaporation of the residual monomers and the precipitation medium without any need for further washing. Accordingly, there is no need for the washing and drying stage. The residual monomers and the precipitation medium may be directly returned to the polymerization circuit without any significant losses.

However, it is also possible directly to convert the polymer into a solution suitable for shaping or forming by subjecting the filter cake laden to a greater or lesser extent, depending on the boiling range, with aliphatic chlorofluorinated hydrocarbon and unreacted monomer to a single-stage or multi-stage wash, optionally under pressure, with a low-boiling organic washing liquid which does not dissolve the polymer, directly introducing the filter cake thus pretreated into a suitable solvent for the polymer, separating off the washing liquid introduced with the polymer and small residues of monomers in an evaporator and simultaneously adjusting the solution to a concentration and viscosity suitable for shaping or forming. In this respect, the miscibility of the halogenated precipitation medium with conventional solvents for acrylonitrile polymers has a positive effect in that it prevents troublesome disintegration processes during evaporation.

Suitable evaporators are in principle the evaporators known from the prior art, such as for example thin-layer evaporators, falling-film evaporators or evaporation screws.

In contrast to conventional processes, there is no need in this method for either an energy-consuming drying stage or for the intermediate storage of dry polymer. Irrespective of the technique used for working up, the process according to the invention provides a simple possibility of recycling all the components of the system.

The polymers produced by the process according to the invention have a number of outstanding properties. In addition to their favorable natural color and narrow molecular weight distribution, they contain from the outset a considerable proportion of acid groups so that mouldings produced from them have an excellent absorption capacity for cationic dyes. This property is also demonstrated by the comparatively high electrical conductivity of the polymer solutions and in a relatively high polymer-fixed sulphur content. Accordingly, there is no longer any need for the use of ionic comonomers containing sulphonic acid groups which is otherwise necessary.

The processing of comonomer-free polyacrylonitriles by conventional methods involves a number of problems: the dissolution of pure polyacrylonitrile is laborious and the viscosity of the solutions formed is unstable as a function of time. In addition, mouldings produced from solutions such as these can only be used in the technical sector because of their unfavorable dyeing behaviour.

By contrast, in accordance with the invention it is possible to produce comonomer-free polyacrylonitriles which, in addition to the favorable properties characteristic of polyacrylonitrile, such as for example the dimensional stability of mouldings produced from them, can also be excellently processed and show a high absorption capacity for cationic dyes.

The dye absorption capacity of the polymers obtained by the process according to the invention was determined as follows:

1 g of dye per liter of solution was dissolved in hot distilled water. 1 ml of dilute acetic acid (30 g/l) and 1 ml of sodium acetate solution (40 g/l) were then added, followed by filling up to the calibration mark at 20° C. The solution was obtained in this way. 50 mg of a film obtained from a solution of the corresponding polymer in dimethyl formamide were heated under reflux for 1.5 hours in 10 ml of the solution described above. After the film had been removed from the solution and rinsed, it was boiled for 30 minutes in distilled water. The film was then dyed with a blue dye corresponding to the formula

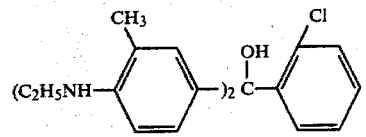

and a red dye corresponding to the formula

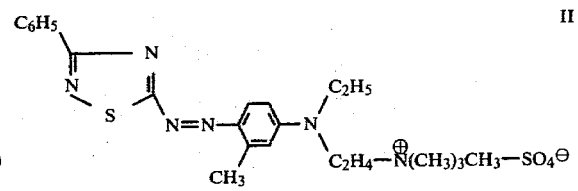

After this treatment, the film was dried and dissolved in dimethyl formamide. The amount of dye taken up was determined by measuring the extinction value using a conventional photometer.

The conductivity values of the polymer quoted above and in the following Examples were determined as follows:

800 mg of thoroughly dried polymer powder were dissolved in 80 ml of dimethyl formamide having an intrinsic conductivity of $<0.06$ $\mu S$ to which 4 ml of methanol having an intrinsic conductivity of $<0.06$ $\mu S$ has been added. The polymer solution thus obtained was then treated with 10 ml of a mixed-bed exchanger in order to separate the ionic compounds which had not been fixed to the polymer. After an exchange period of 30 minutes, the supernatant clear polymer solution was removed and its conductivity measured at 20° C. using a conventional measuring cell. The measured value, expressed in $\mu$ Siemens, is a measure of the concentration of ionic groups fixed to the polymer.

The above-mentioned K-values of the polymers were determined in 1% dimethyl formamide solution at 20° C. in accordance with H. Fikentscher, Cellulosechemie 15 (1932), pages 58. The intrinsic viscosities [$\eta$] quoted in the Examples were measured in dimethyl formamide solution at 25° C. and are expressed in dl/g. For the definition of intrinsic viscosity, see H. G. Elias, Makromoleküle, Hüthig u. Wepf-Verlag, Basel, page 265.

The invention is illustrated by the following Example, in which parts by weight are to parts by volume as kilograms to liters.

EXAMPLE 1

(a) Production of an acrylonitrile/methylacrylate copolymer 900 parts by volume of trichlorofluoromethane (b.p. 23.6° C.), 125 parts by volume of acrylonitrile, 10 parts by volume of methylacrylate, 4 parts by weight of trichloroacetic acid and 1.5 parts by volume of tert.-butyl hydroperoxide were initially introduced into an autoclave. After nitrogen had been passed through at 25° C., the following three solutions were simultaneously introduced under pressure at a constant rate over a period of 5.5 hours:

Solution I
900 parts by volume of trichlorofluoromethane
600 parts by volume of acrylonitrile 30 parts by volume of methylacrylate
Solution II
1000 parts by volume of trichlorofluoromethane
100 parts by volume of sulphur dioxide condensed
Solution III
800 parts by volume of trichlorofluoromethane
500 parts by volume of acrylonitrile
25 parts by volume of methylacrylate
7 parts by volume of tert.-butyl hydroperoxide.

After these three solutions has been added, the contents of the autoclave were centrifuged, washed with 100 parts by volume of precipitation medium and dried in vacuo. A polymer having the following properties was isolated:
Composition:
95% by weight of acrylonitrile
5.6% by weight of methylacrylate
0.4% by weight of fixed sulphur
K-value 79
Conductivity 13 μS
Yield 800 parts by weight (80%).

(b) Determination of the dye absorption capacity:

Part of the polymer removed from the centrifuge after washing and still containing precipitation medium (solids content 88% by weight) was immediately introduced into dimethyl formamide. After a short dissolving time, the residual monomers and precipitation medium were evaporated in a thin layer evaporator at 0.6 bar/46° C. until a 27% by weight solution of the acrylonitrile/methylacrylate copolymer having a viscosity of 84 Pas/20° C. was formed.

This solution was then processed to form a film having a thickness of 50 μm. The film material thus obtained was dyed with the blue dye I and the red dye II described above and the dye absorption capacity determined by comparison with a standard commercial material (composition 94% by weight of acrylonitrile, 5% by weight of methylacrylate. 1.0% by weight of methallyl suplhonate).

|  | Dye absorption of the film obtained by the process according to the invention | Dye absorption of the comparison film (commercial product) |
|---|---|---|
| Dye I blue | 12.6% by weight | 5.7% by weight |
| Dye II red | 4.2% by weight | 3.2% by weight |

EXAMPLE 2

Production of a unipolymeric acrylonitrile:

250 parts by volume of trichlorotrifluoroethane (b.p. 47.6° C.), 30 parts by volume of acrylonitrile and 0.5 part by weight of trichloroacetic acid were initially introduced into a reactor. After nitrogen had been passed through at 25° C., the following three solutions were introduced over a period of 3 hours:
Solution I
400 parts by volume of trichlorotrifluoroethane
150 parts by volume of acrylonitrile
Solution II
20 parts by volume of trichlorotrifluoethane
60 parts by volume of acrylonitrile
25 parts by volume of sulphur dioxide condensed
Solution III
200 parts by volume of trichlorotrifluoethane
30 parts by volume of acrylonitrile
2 parts by volume of tert.-butyl hydroperoxide.

The reaction was complete after a total of 4 hours at 33° C. The reaction product was processed in the same way as in Example 1, giving a polymer having the following properties:
99.4% by weight of acrylonitrile
0.6% by weight of fixed sulphur
K-value: 81.6
conductivity: 14.8 μS
yield: 160 parts by weight (74%).

The dye absorption capacity was determined by the method described in Example 1 (dissolving the polymer in dimethyl formamide, forming a 50 μm thick film and dyeing) by comparison with a standard commercial material (composition: 99.8% by weight of acrylonitrile, 0.2% by weight of sulphur). The results obtained were as follows:

|  | Dye absorption of the film obtained by the process according to the invention | Dye absorption of the comparison film (commercial product) |
|---|---|---|
| Dye I blue | 7.1% by weight | 1.5% by weight |
| Dye II red | 3.8% by weight | 0.5% by weight |

EXAMPLE 3

Production of an acrylonitrile/methylacrylate copolymer:

250 parts by volume of dichlorotetrafluoethane (b.p. 3.6° C.), 32 parts by volume of acrylonitrile, 2.4 parts by volume of methylacrylate, 1.0 part by weight of trichloroacetic acid and 0.5 part by volume of tert.-butyl hydroperoxide were initially introduced into a reactor. The following three solutions were added over a period of 3 hours under nitrogen and reflux:
Solution I
400 parts by volume of dichlorotetrafluoroethane
150 parts by volume of acrylonitrile
8 parts by volume of methylacrylate
Solution II
30 parts by volume of dichlorotetrafluoroethane
45 parts by volume of sulphur dioxide condensed
Solution III
200 parts by volume of dichlorotetrafluoroethane
100 parts by volume of acrylonitrile
5 parts by volume of methylacrylate
2.2 parts by volume of tert.-butyl hydroperoxide.

After 5 hours under reflux, the reaction was complete. A polymer with the following properties was obtained:
Composition:
94% by weight of acrylonitrile
5.4% by weight of methylacrylate
0.6% by weight of fixed sulphur
K-value 77
conductivity 16 μS
Yield: 180 parts by weight (68%).

The dye absorption capacity was determined by the method described in Example 1 (dissolving the polymer in dimethyl formamide, forming a 50 μm thick film and dyeing) by comparison with a standard commercial material (composition 94% by weight of acrylonitrile, 5% by weight of methylacrylate and 1.0% by weight of methallyl suplphonate). The results obtained were as follows

|  | Dye absorption of the film obtained by the process according to the invention | Dye absorption of the comparison film (commercial product) |
|---|---|---|
| Dye I blue | 12.1% by weight | 5.7% by weight |
| Dye II red | 4.4% by weight | 3.2% by weight |

EXAMPLE 4

Production of an acrylonitrile/methylacrylate copolymer:

150 parts by volume of dichlorotetrafluoethane (b.p. 3.6), 54 parts by volume of acrylonitrile, 4 parts by volume of methylacrylate and 3 parts by volume of tert.-butyl hydroperoxide were initially introduced into a reactor. The following solutions were added dropwise over a period of 4 hours under nitrogen and reflux:

Solution I
406 parts by volume of acrylonitrile
30 parts by volume of methylacrylate
30 parts by volume of sulphur dioxide Solution II
150 parts by volume of dichlorotetrafluoroethane
16 parts by volume of tert.-butyl hydroperoxide
80 parts by volume of acrylonitrile.

After a total polymerization time of 5 hours, the reaction product was processed in the usual way, giving a polymer with the following properties:

Composition:
94% by weight of acrylonitrile
5.4% by weight of methylacrylate
0.6% by weight of fixed sulphur
K-value 78
conductivity 14 μS
yield: 280 parts by weight (60%).

The dye absorption capacity was determined by the method described in Example 1 using the same commercial product for comparison. The results obtained were as follows:

|  | Dye absorption of the film obtained by the process according to the invention | Dye absorption of the comparison film (commercial product) |
|---|---|---|
| Dye I blue | 11.8% by weight | 5.7% by weight |
| Dye II red | 4.7% by weight | 3.2% by weight. |

What is claimed is:

1. A process for the production of polyacrylonitrile or acrylonitrile copolymers, which comprises polymerizing acrylonitrile alone or with up to 30% by weight of at least one ethylenically unsaturated comonomer at a temperature of from −40° to +60° C., in an aliphatic chloro-fluorine- or fluorine-substituted hydrocarbon containing up to 8 carbon atoms and having a boiling point of −60° to +50° C. or in mixtures thereof having boiling ranges of from −60° to +50° C. and using a starter system consisting of from 0.1 to 0.3 mole % of a hydroperoxide, from 0.1 to 12 mole % of sulphur dioxide and from 0.01 to 1.0 mole % of a partially halogenated or perhalogenated carboxylic acid containing up to 10 carbon atoms (based on the total amount of monomers used), polymerization being continued up to conversions of from 30 to 90% by weight.

2. The process of claim 1, wherein said ethylenically unsaturated co-monomer is selected from (meth) acrylic acid alkyl ester, a vinyl ester of aliphatic carboxylic acids, styrene or alkyl-substituted styrene, maleic acid anhydride and an N-alkyl-substituted maleic acid imide.

3. The process of claim 1, wherein said ethylenically unsaturated co-monomer is maleic acid anhydride or an N-alkyl-substituted maleic acid imide combined with styrene in a molar ratio of from 1:1 to 1:4.

4. The process of claim 1, wherein said ethylenically unsaturated comonomer is copolymerized in a quantity of up to 15% by weight, based on the acrylonitrile used.

5. The process of claim 1, wherein said hydroperoxide is tert.-butyl hydroperoxide and/or cumene hydroperoxide.

6. The process of claim 1, wherein said chlorofluorinated or fluorinated hydrocarbon is selected from trichlorofluoromethane (b.p. 23.7° C.), dichlorodifluoromethane (b.p. −29.8° C.), chlorodifluoromethane (b.p. −40.8° C.), trichlorotrifluoroethane (b.p. 47.6° C.), monochloromonofluoroethane (b.p. 35° C.), dichlorotrifluoroethane (b.p. 27.8° C.), monochlorotrifluoroethane (b.p. 17.2° C.), dichlorotetrafluoroethane (b.p. 3.6° C.), monochlorotetrafluoroethane (b.p. −10° C.), difluoroethane (b.p. −25° C.), pentafluoroethane (b.p. −48.3° C.), and perfluorocyclobutane (b.p. −3° C.).

7. The process of claim 1, wherein said chlorofluorine- or fluorine-substituted hydrocarbon or mixtures thereof are mixed with an aliphatic hydrocarbon or mixture thereof having a boiling point of from −60° to +50° C. in such quantities that a non-inflammable mixture is formed.

* * * * *